United States Patent
Misonoo et al.

(10) Patent No.: US 8,085,619 B2
(45) Date of Patent: Dec. 27, 2011

(54) FISH FINDER

(75) Inventors: Satoshi Misonoo, Nishinomiya (JP);
Yasunobu Asada, Nishinomiya (JP);
Norihiro Nishimoto, Nishinomiya (JP);
Masaaki Matsubara, Nishinomiya (JP)

(73) Assignee: Furuno Electric Company, Limited, Hyogo (JP)

( * ) Notice: Subject to any disclaimer, the term of this patent is extended or adjusted under 35 U.S.C. 154(b) by 74 days.

(21) Appl. No.: 12/793,780

(22) Filed: Jun. 4, 2010

(65) Prior Publication Data

US 2010/0309753 A1    Dec. 9, 2010

(30) Foreign Application Priority Data

Jun. 5, 2009   (JP) ................................. 2009-136434

(51) Int. Cl.
*G01S 15/96* (2006.01)
(52) U.S. Cl. ...................................................... 367/107
(58) Field of Classification Search .................. 367/107, 367/111, 7, 11, 88
See application file for complete search history.

(56) References Cited

U.S. PATENT DOCUMENTS

| | | | |
|---|---|---|---|
| 4,829,492 A * | 5/1989 | Choi et al. ..................... | 367/111 |
| 6,009,373 A | 12/1999 | Shimojima et al. | |
| 2008/0192575 A1 | 8/2008 | Coleman | |
| 2009/0064057 A1 * | 3/2009 | Bull et al. ...................... | 715/864 |
| 2010/0302176 A1 * | 12/2010 | Nikula et al. .................. | 345/173 |
| 2010/0309753 A1 * | 12/2010 | Misonoo et al. .............. | 367/107 |

FOREIGN PATENT DOCUMENTS

| | | | |
|---|---|---|---|
| GB | 1591756 A | | 6/1981 |
| GB | 2357840 A | | 7/2001 |
| GB | 2470828 A | * | 12/2010 |
| JP | 9-243735 A | | 9/1997 |
| JP | 11-66330 A | | 3/1999 |
| JP | 2009-69164 A | | 4/2009 |

* cited by examiner

*Primary Examiner* — Daniel Pihulic
(74) *Attorney, Agent, or Firm* — Birch, Stewart, Kolasch & Birch, LLP

(57) ABSTRACT

This disclosure provides a fish finder, which includes a transmission module and a reception module, for outputting an ultrasonic wave underwater, receiving an echo, and outputting a reception signal corresponding to an intensity of the received echo, a control module for generating echo data corresponding to a depth based on the reception signal, a display module for displaying the echo data, and a user interface for receiving a user's operation. The control module causes the display module to display the echo data so that the echo data is displayed in two or more display screens. At least one display screen displays an area having a color different from a background color. A part of the echo data at a depth range corresponding to a height of the area is displayed in the other display screen so as to expand the echo data in a depth direction. The user interface specifies a position and a size of the area via the user's operation.

7 Claims, 6 Drawing Sheets

ENLARGED IMAGE    NORMAL ENTIRE SCREEN IMAGE

FISH FINDER

CROSS-REFERENCE TO RELATED APPLICATION(S)

This application claims priority under 35 U.S.C. §119 to Japanese Patent Application No. 2009-136434, which was filed on Jun. 5, 2009, the entire disclosure of which is hereby incorporated by reference.

TECHNICAL FIELD

The present invention relates to a fish finder, and more particularly to a screen indication for the fish finder.

BACKGROUND

Conventionally, for devices for carrying out graphical representation of measurement results and analysis results, a technique for partially enlarging a graph is proposed (for example, refer to JP H11-066330(A)). The graphical representation device of JP H11-066330(A) specifies the enlarging range by a rectangular window displayed in the graph. The enlarging range is specified by a user specifying a position and a size of the window using a mouse.

However, the specifying technique of the enlarging range proposed in JP H11-066330(A) is not suitable for the conventional fish finders. FIG. 1 is a view showing an example of an image display of echo data in the conventional fish finder. In FIG. 1, an example of dual screen image constituted with a normal entire screen image on the right side and an enlarged screen image thereof on the left side is shown.

As shown in FIG. 1, many images indicative of echo data (a school of fish, etc.) and noises are displayed in the screen of the fish finder. The echo data are generally displayed in a darker color as their reflection intensity becomes higher. For this reason, if the user tries to specify the enlarging range by the rectangular window, the window overlaps with the images of high-intensity echo data; thereby user's visual recognition will be greatly deteriorated. In addition, the conventional fish finder does not display common results which are fixedly displayed in a graph, but it time-sequentially displays echo data per one longitudinal line of the display screen at a time to update the screen image by line. Therefore, the user must determine the enlarging range referring to images of new echo data which are updated every moment while taking a depth displayed in the screen into consideration, not specifying the enlarging range by including only the past images already displayed.

For example, as shown in FIG. 1, a case where an upper end and a lower end of the enlarging range are specified by Line 1 and Line 2 which are displayed in the normal entire screen image is considered. Here, it is assumed that a school of fish B is newly displayed by the update when the user is about to specify the enlarging range on the basis of a school of fish "A" which is already displayed near the center of the screen. In this case, the user probably specifies the upper end and the lower end of the enlarging range taking depths of the two schools of fish into consideration. However, in this case, Line 2 overlaps with the image of the school of fish B and Line 1 overlaps with images of noises and a depth scale and, thus, the enlarged image is very bad in visual recognition. In addition, specifying of a lateral width may also be required in fact for some cases, which further deteriorates the visual recognition.

As described above, the window possibly overlaps with the images of echo data in many cases in the conventional fish finders. Therefore, it is difficult to specify a desired enlarging range only by the technique of simply specifying a desired position in the graph by the rectangular window like JP H11-066330(A).

SUMMARY

Thus, the present invention is made in the view of addressing the above situations and, thus, it provides a fish finder for allowing a user to easily specify an enlarging range in an image display of echo data.

According to an aspect of the invention, a fish finder includes a transmission module and a reception module, for outputting an ultrasonic wave underwater, receiving an echo, and outputting a reception signal corresponding to an intensity of the received echo, a control module for generating echo data corresponding to a depth based on the reception signal, a display module for displaying the echo data, and a user interface for receiving a user's operation. The control module causes the display module to display the echo data so that the echo data is displayed in two or more display screens. At least one display screen displays an area having a color different from a background color. A part of the echo data at a depth range corresponding to a height of the area is displayed in the other display screen so as to expand the echo data in a depth direction. The user interface specifies a position and a size of the area via the user's operation.

Thus, because the fish finder displays the image for specifying the enlarging range as an area having a color different from the background color, visual recognition is not deteriorated even when the image of the enlargement specifying area overlaps with the echo data image and/or noise(s). Therefore, the visual recognition is remarkably improved in expanding an image of a school of fish.

The control module may cause the display module to display a portion other than an image of the echo data in a color different from the background color.

The control module may cause the display module to display the color different from the background color in a permeable color.

The control module may emphasize the area displayed when the control module receives the user's operation for specifying the position and the size of the area.

The control module may cause the display module to display the echo data contained in a depth range wider than the height of the area in the other display screen, and display a color different from the background color in a depth range corresponding to the height of the area in the other display screen.

The control module may cause the display module to display a cursor according to the user's operation via the user interface, and emphasize the area displayed when displaying the cursor in the area.

The control module may cause the display module to stop the emphasizing of the area when a predetermined time has lapsed after the cursor is displayed in the area.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
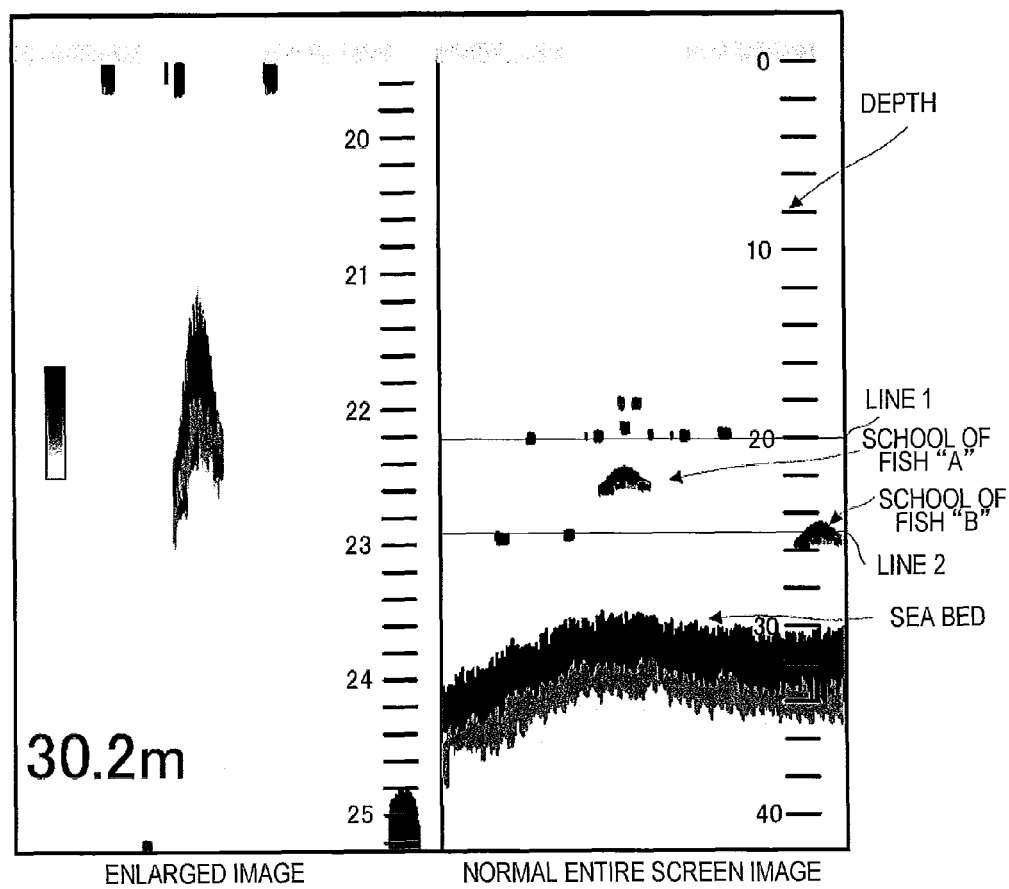
FIG. 1 is a view showing an example of a conventional image display of echo data.
Figure 2:
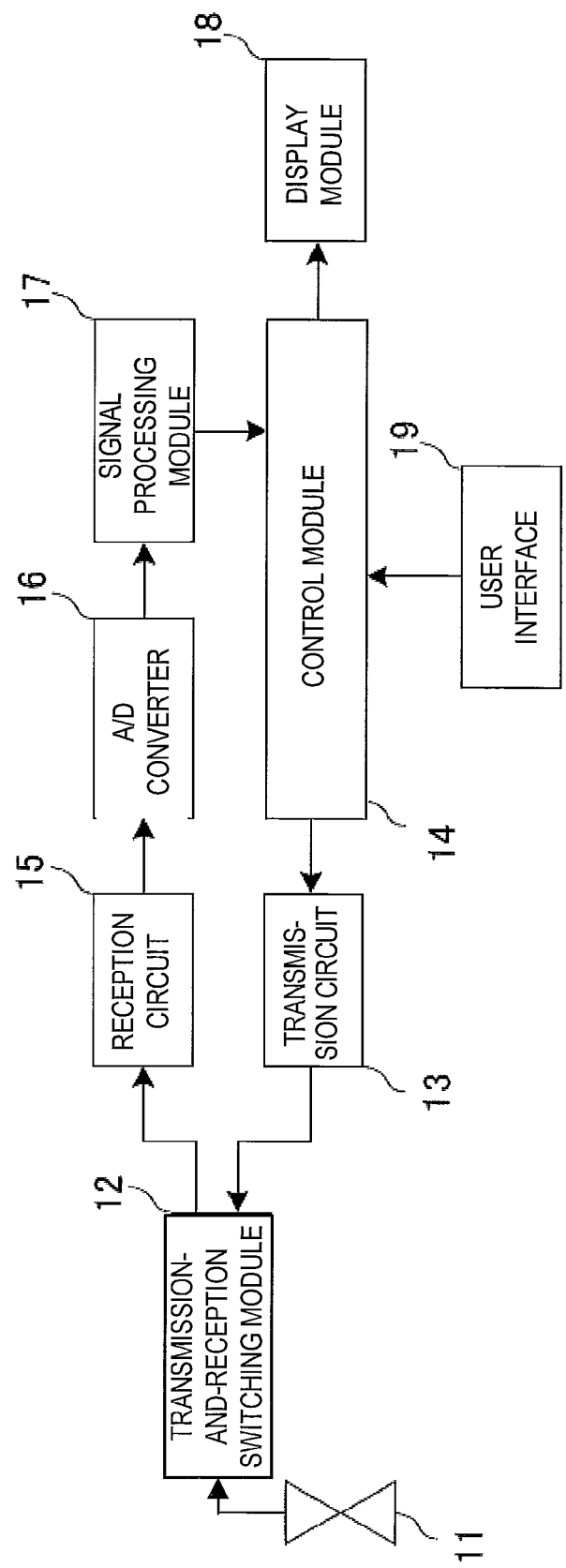
FIG. 2 is a block diagram showing a configuration of a fish finder according to an embodiment of the invention.

FIG. 2 is a block diagram showing a configuration of a fish finder according to an embodiment of the present invention. The fish finder includes a transducer 11, a transmission-and-reception switching module 12, a transmission circuit 13, a control module 14, a reception circuit 15, an A/D converter 16, a signal processing module 17, a display module 18, and a user interface 19.

The transmission circuit 13 inputs a pulse-shaped signal into the transducer 11 via the transmission-and-reception switching module 12 which is provided with a trap circuit therein. An input timing and a level of the signal are controlled by the control module 14. The transducer 11 is typically an oscillator attached to the bottom or the like of a ship (not illustrated), and outputs an ultrasonic wave underwater according to the pulse-shaped signal inputted from the transmission circuit 13.

The ultrasonic wave outputted from the transducer 11 reflects on a target object and is received as an echo. The transducer 11 outputs the received echo or signal according to an intensity of the received echo to the reception circuit 15 via the transmission-and-reception switching module 12. The reception circuit 15 amplifies the inputted reception signal and outputs it to the A/D converter 16. The A/D converter 16 converts the reception signal into a digital signal and outputs it to the signal processing module 17. The signal processing module 17 sequentially records the digitized reception signal in a memory (not illustrated).

The control module 14 performs processing for visualizing the reception signals recorded by the signal processing module 17. That is, the control module 14 performs processing for displaying each reception signal sequentially recorded by the signal processing module 17 on the display module 18 as echo data corresponding to a depth, in accordance with a lapsed time after the output of the ultrasonic wave.

Figure 3A:
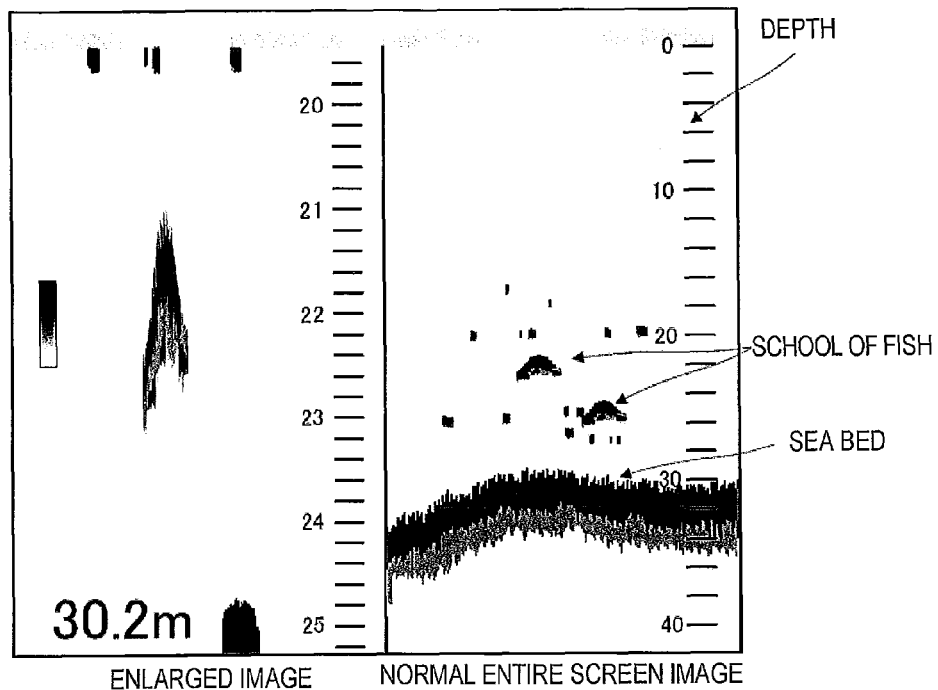
FIGS. 3A and 3B are views showing examples of an image display of echo data according to the embodiment.

FIG. 3A is a view showing an example of the image display of the echo data displayed on the display module 18. In the example of FIG. 3A, a normal entire screen image is displayed on the right side, and an enlarged screen image thereof is displayed on the left side. In each display screen, the echo data is typically the newest at the right end of the screen image, and one vertical line is time-sequentially updated at a time for every predetermined time. In fact, the echo data corresponding to each line is typically generated by one or more transmissions and receptions of the ultrasonic wave, and is echo data after processing, such as interference removal, performed in the signal processing module 17. The image of the echo data displayed may be compressed or elongated into the lateral direction according to a traveling speed of the ship. The echo data is displayed by an image of darker color as an intensity of the echo becomes higher.

The control module 14 displays an area (enlargement specifying area) having a color different from a background color in the normal entire screen image. The color different from the background color (color in the enlargement specifying area) may be desirable to be permeable so as not to disturb visual recognition of the echo data image. For example, in FIG. 3A, the background is displayed in white and the enlargement specifying area is displayed in a light gray. In addition, the enlargement specifying area may be desirable to be displayed in a color also different from the echo data image or a depth scale image. In addition, the color of the echo data image may be desirable to be displayed as it is, and images of other parts including the enlargement specifying area and the scale may be desirable to be displayed in permeable colors different from the background color. If the color of the echo data image is displayed as it is as described above, a user will not misjudge information which can be determined from the indication color (for example, a fish size, a density of a school of fish and the like). Note that, even if a permeable color is used for the entire part of the enlargement specifying area, a color tone of the echo data image is desirable not to be changed.

The area described above is an area for specifying an enlarging range. The control module 14 displays the echo data at a depth range corresponding to a height of the enlargement specifying area so as to enlarge the echo data in the enlarged screen image.

Figure 4A:
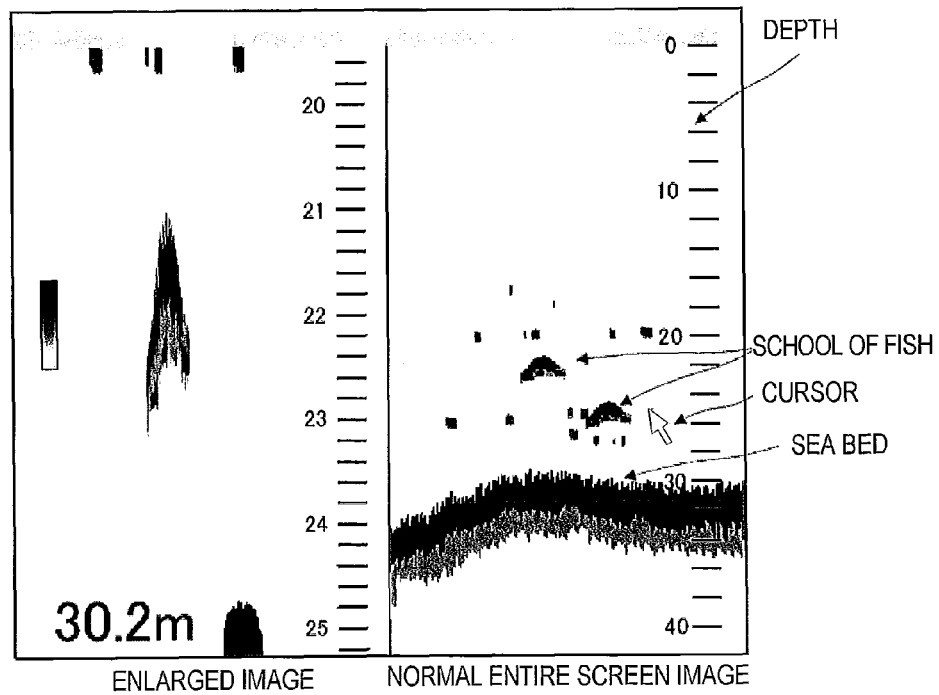
FIGS. 4A and 4B are views showing examples of the image display of echo data when displaying a cursor.

The user specifies the position and the height of the enlargement specifying area by using the user interface 19, such as a mouse or a keyboard. For example, the user changes positions of the upper end and the lower end of the enlargement specifying area using a toggle or a key of the user interface 19. Alternatively, the user may specify the area by inputting numerical values indicative of depths of the upper and lower ends. Alternatively, as shown in FIG. 4A, the control module 14 may displays a cursor in the normal entire screen image, and the user may operate the cursor by the user interface 19 to drag it over the area to specify the upper and lower ends of the area.

When the user changes the height of the enlargement specifying area, a depth range of the enlarged screen image is also changed so as to be synchronized, but the echo data image may be compressed or elongated in the vertical direction. Note that, in the example shown in FIG. 3A, although the screen widths of the normal entire screen image and the enlarged screen image are the same, the screen width of the enlarged screen image may be changed by changing the width of the enlargement specifying area. In this case, when a short width is specified for the enlargement specifying area, the area may be displayed in the enlarged screen image so as to be elongated to fully use the original width of the enlarged screen image.

Note that the enlargement specifying area may be displayed even when the echo image(s) is/are not displayed. In this case, the user may read the depth scale as a guide to specify the position and the width of the enlargement specifying area. This may be useful when a depth range of the target object (e.g., school of fish) is known beforehand or can be estimated.

As described above, according to the fish finder of this embodiment, the image for specifying the enlarging range is displayed as an area having a permeable color different from the background color. Therefore, the window (enlargement specifying area) does not overlap with the images of the echo data or noises which are time-sequentially updated per line. Thereby, visual recognition will not be deteriorated, and visual recognition will be remarkably improved even when a school of fish is expanding.

Figure 3B:
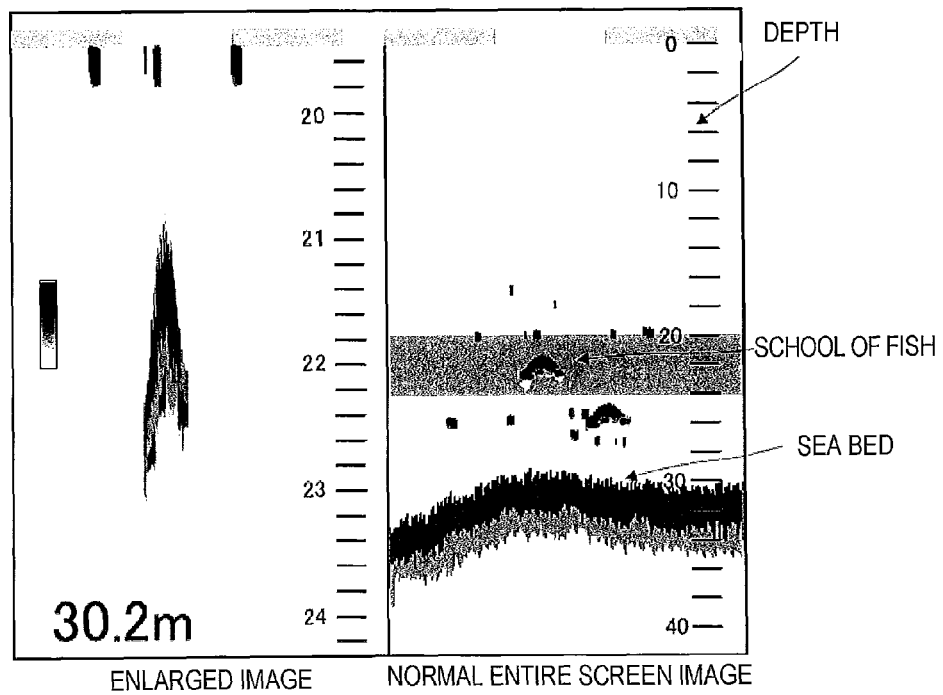

Alternatively, the fish finder of this embodiment may also be configured as follows. That is, as shown in FIG. 3B, when the user changes the enlarging range for specifying the position and the width of the enlargement specifying area using the toggle or key, the control module 14 then changes the color of the area to emphasize the indication of the area. For example, the color of the area is displayed in a darker color and its brightness is increased. Thereby, the visual recognition of the area can be further improved, and therefore, the user can visually recognize the enlarging range to specify certainly.

Figure 4B:
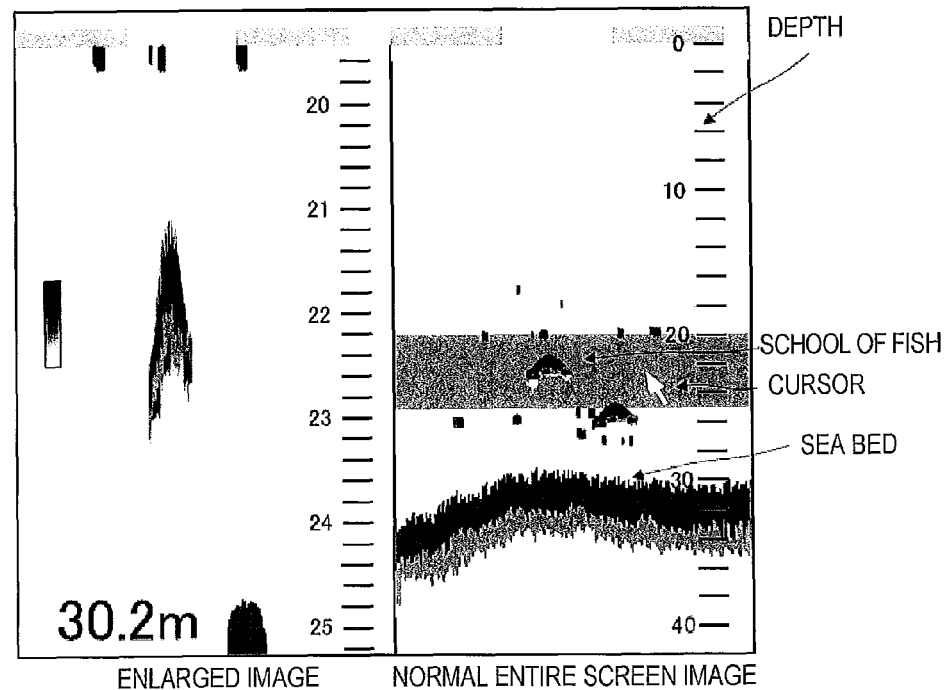

If the control module 14 displays the cursor in the normal entire screen image, as shown in FIG. 4B, when the user operates the cursor to move it into the enlargement specifying area using the user interface 19, the control module 14 changes the color of the area to emphasize the indicate of the area. In this case, the control module 14 may cancel the emphasis indication of the area into which the cursor is moved, when a predetermined time has lapsed since the cursor is stopped. Alternatively, even when the cursor is still moving in the area, the control module 14 may cancel the emphasis indication after a predetermined time has lapsed. Because the emphasis indication is canceled after changing the position and the size of the enlargement specifying area, the image of the echo data in the normal entire screen image becomes easier to be viewed and, thus, the user does not have to move the cursor out of the area. Further, even after the predetermined time has lapsed, the control module 14 may again perform the emphasis indication when the user restarts moving the cursor.

Figure 5A:
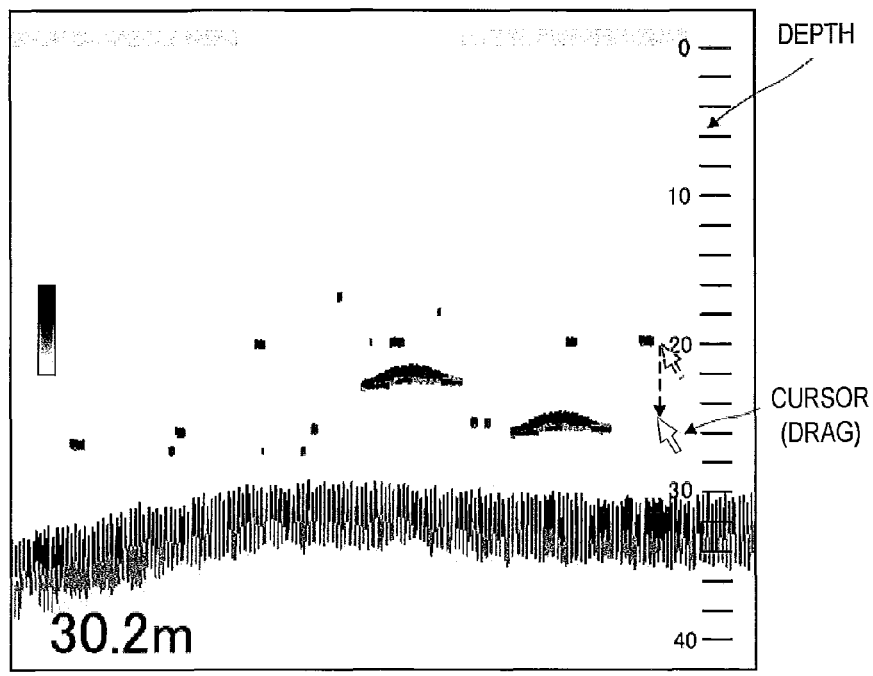
FIGS. 5A and 5B are views showing another examples of the image display of echo data according to the embodiment.
Figure 5B:
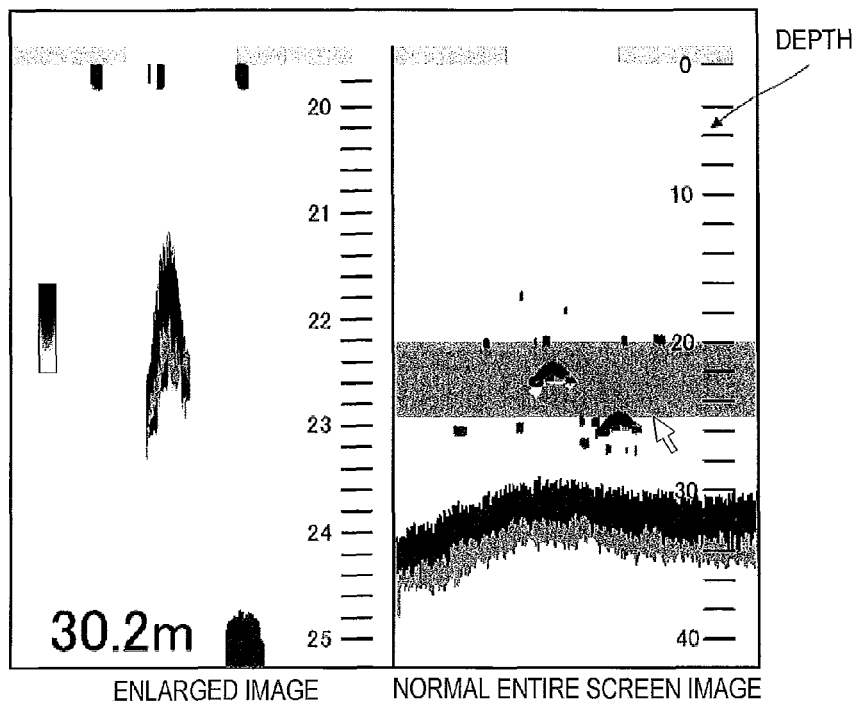

Next, FIG. 5A is a view showing a screen image displayed when the fish finder is booted up. The control module 14 originally displays only the normal entire screen image shown in FIG. 5A in the entire screen of the display module 18 when the user boots up the fish finder. Here, if the user drags the cursor using the user interface 19, as shown in FIG. 5B, the control module 14 displays two or more display screens, such as the normal entire screen image and the enlarged screen image, and displays the enlargement specifying area in the normal entire screen image. Thus, in the state where only the normal entire screen image is displayed, when the user drags the cursor, the control module 14 automatically displays the two or more screen images and the enlarged screen image. In this case, the user can easily specify the enlarging range, and he/she does not need to switch between the screen images.

Alternatively, the two or more display screens, such as the normal entire screen image and the enlarged screen image, may be originally displayed when the fish finder is booted up. In this case, the control module 14 may display a seabed and near a sea surface in the enlarged screen image as a default enlarging range, for example. Alternatively, once the user specifies the enlarging range, and when the fish finder is then rebooted (or when the display is transited from the full screen image of the normal entire screen image to the multiple screens), the control module 14 may display the enlarging range already specified in the last enlarged screen image. In this case, the control module 14 may store the enlarging range (depth range) in a built-in memory, and when changing the screen to the multiple screens, it may read out the stored enlarging range and display the read enlarging range.

Figure 6A:
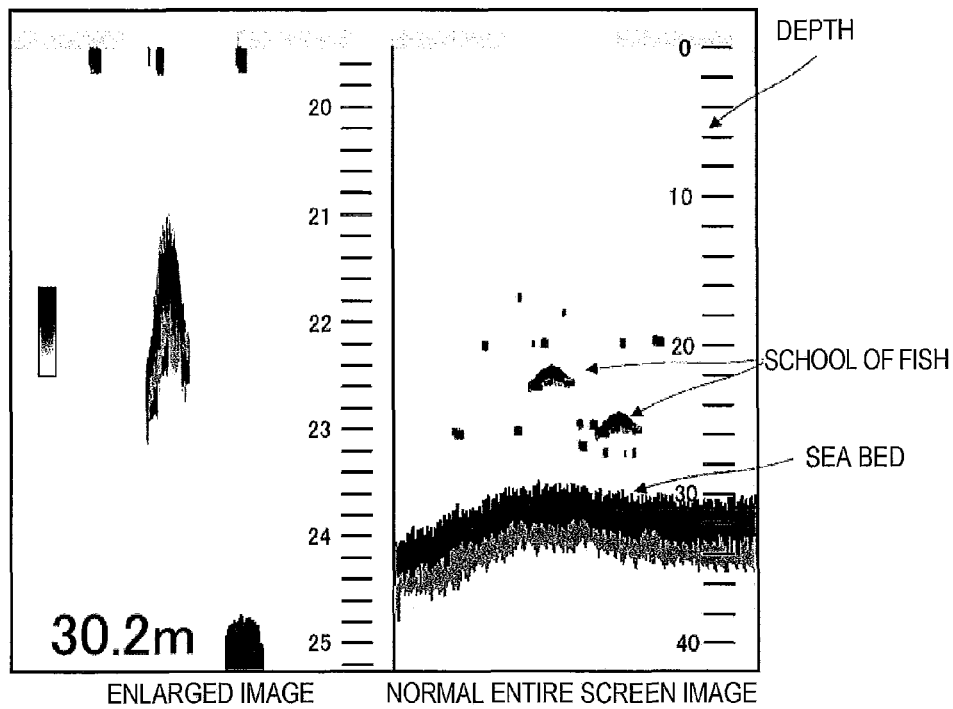
FIGS. 6A and 6B are views showing still another examples of the image display of echo data according to the embodiment.

Alternatively, the background color may be displayed in the enlargement specifying area and permeable colors may be displayed in other portions of the screen. For example, as shown in FIG. 6A, the inside of the enlargement specifying area is displayed in white which is the background color, and the other portions are displayed in a light gray.

Figure 6B:
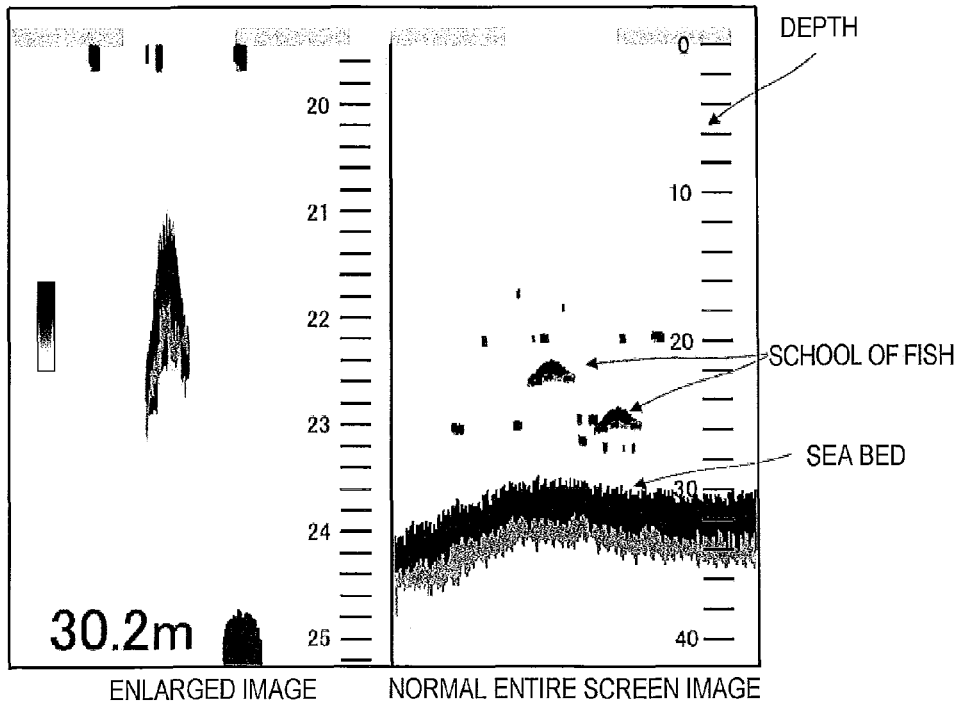

In the above embodiment, although a depth range slightly wider than the height of the enlargement specifying area which is specified in the normal entire screen image is displayed as the enlarged screen image, a depth range corresponding to the height of the enlargement specifying area (that is, the same depth range) may be displayed in the enlarged screen image. If displaying the depth range slightly wider than the height of the enlargement specifying area in the enlarged screen image, as shown in FIG. 6B, it may be desirable to display a portion indicative of the outside (or the inside) of the depth range actually specified may be displayed in a lighter color (or displayed by lines). In this case, the correspondence between the depth range of the enlargement specifying area actually specified in the normal entire screen image and the depth range in the enlarged screen image can be intelligible intuitively.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:
1. A fish finder, comprising:
   a transmission module and a reception module, for outputting an ultrasonic wave underwater, receiving an echo, and outputting a reception signal corresponding to an intensity of the received echo;
   a control module for generating echo data corresponding to a depth based on the reception signal;

a display module for displaying the echo data; and
a user interface for receiving a user's operation;
wherein the control module causes the display module to display the echo data so that the echo data is displayed in two or more display screens, at least one display screen displays an area having a color different from a background color, and a part of the echo data at a depth range corresponding to a height of the area is displayed in the other display screen so as to expand the echo data in a depth direction; and
wherein the user interface specifies a position and a size of the area via the user's operation.

2. The fish finder of claim 1, wherein the control module causes the display module to display a portion other than an image of the echo data in a color different from the background color.

3. The fish finder of claim 1, wherein the control module causes the display module to display the color different from the background color in a permeable color.

4. The fish finder of claim 1, the control module emphasizes the area displayed when the control module receives the user's operation for specifying the position and the size of the area.

5. The fish finder of claim 1, wherein the control module causes the display module to display the echo data contained in a depth range wider than the height of the area in the other display screen, and display a color different from the background color in a depth range corresponding to the height of the area in the other display screen.

6. The fish finder of claim 1, wherein the control module causes the display module to display a cursor according to the user's operation via the user interface, and emphasize the area displayed when displaying the cursor in the area.

7. The fish finder of claim 6, wherein the control module causes the display module to stop the emphasizing of the area when a predetermined time has lapsed after the cursor is displayed in the area.

* * * * *